US009134849B2

(12) United States Patent
Chang et al.

(10) Patent No.: US 9,134,849 B2
(45) Date of Patent: Sep. 15, 2015

(54) PEN INTERFACE FOR A TOUCH SCREEN DEVICE

(71) Applicant: barnesandnoble.com llc, New York, NY (US)

(72) Inventors: Songan Andy Chang, Mountain View, CA (US); Charles Neugebauer, Los Altos, CA (US)

(73) Assignee: NOOK DIGITAL, LLC, New York, NY (US)

( * ) Notice: Subject to any disclaimer, the term of this patent is extended or adjusted under 35 U.S.C. 154(b) by 0 days.

(21) Appl. No.: 13/659,698

(22) Filed: Oct. 24, 2012

(65) Prior Publication Data
US 2013/0100074 A1    Apr. 25, 2013

Related U.S. Application Data (60) Provisional application No. 61/551,336, filed on Oct. 25, 2011.

(51) Int. Cl.
*G06F 3/041*    (2006.01)
*G06F 3/044*    (2006.01)
*G06F 3/046*    (2006.01)

(52) U.S. Cl.
CPC .............. *G06F 3/0418* (2013.01); *G06F 3/044* (2013.01); *G06F 3/046* (2013.01); *G06F 2203/04106* (2013.01)

(58) Field of Classification Search
USPC ................................. 345/156–178
See application file for complete search history.

(56) References Cited

U.S. PATENT DOCUMENTS

| | | | |
|---|---|---|---|
| 6,118,437 A | 9/2000 | Fleck et al. | |
| 7,486,282 B2 | 2/2009 | Russo | |
| 7,847,789 B2 * | 12/2010 | Kolmykov-Zotov et al. | 345/173 |
| 7,928,964 B2 | 4/2011 | Kolmykov-Zotov et al. | |
| 8,248,084 B2 * | 8/2012 | Bokma et al. | 324/658 |
| 8,558,802 B2 * | 10/2013 | Osoinach et al. | 345/173 |
| 2009/0078476 A1 | 3/2009 | Rimon et al. | |
| 2009/0141008 A1 | 6/2009 | Johnson et al. | |
| 2009/0167702 A1 * | 7/2009 | Nurmi | 345/173 |
| 2009/0273565 A1 | 11/2009 | Garside et al. | |
| 2010/0066705 A1 | 3/2010 | Keely et al. | |
| 2010/0090712 A1 | 4/2010 | Vandermeijden | |
| 2010/0123666 A1 | 5/2010 | Wickholm et al. | |
| 2010/0141410 A1 | 6/2010 | Aono et al. | |
| 2010/0261466 A1 | 10/2010 | Chang et al. | |
| 2011/0193776 A1 | 8/2011 | Oda et al. | |

OTHER PUBLICATIONS

International Search Report, International Application No. PCT/US2012/061872, mailed Feb. 28, 2013.

* cited by examiner

*Primary Examiner* — Kent Chang
*Assistant Examiner* — Nathan Brittingham
(74) *Attorney, Agent, or Firm* — Winston & Strawn LLP (57) ABSTRACT

A system and method that allows pen input and touch input to better co-exist during writing on a touch screen device, such as a tablet device. If the pen/stylus is detected as present and is pointed at the surface, inputs initiated by a user's finger (or other) touch are rejected and pen inputs are allowed. If the pen is detected as present, but is pointed away from the writing surface of the touch screen, stylus/pen inputs are rejected and touch inputs are allowed. If pen is not detected as present, the system ignores all pen inputs. Erasing functions are also provided. The size of the eraser can be made proportional to the pressure level, contact size or signal level of the pen or the user's finger performing the erasing.

9 Claims, 8 Drawing Sheets

PEN INTERFACE FOR A TOUCH SCREEN DEVICE

CROSS-REFERENCE TO RELATED APPLICATION

This application claims benefit of U.S. Provisional Application No. 61/551,336, filed Oct. 25, 2011, which is hereby incorporated by reference.

FIELD OF THE INVENTION

The present invention generally relates to input/output devices, and more particularly to the interface for a stylus device for a touch screen.

BACKGROUND OF THE INVENTION

In traditional hybrid/dual input systems that support both touch and pen input on a touch screen there are a number of problems that cause a poor user experience. One significant problem is accidental touch inputs by the user while she is writing with a stylus. Typically, a user will rest her hand or palm on the touch screen display during the act of writing with the stylus. The user's hand or palm contact with the screen can generate touch input that resembles finger inputs. This limitation of traditional systems has caused these systems to develop exclusive modes of input. For example, during a note taking applications input is limited to pen only in order to avoid erroneous touch detection described above.

In traditional systems, a user needed to manually change the input mode from pen to touch or from touch to pen.

SUMMARY OF THE INVENTION

The present invention helps to improve the user experience by allowing pen input and touch input to better co-exist during writing on a touch screen device, such as a tablet device. This harmonization of pen and touch inputs is made possible by recognizing certain features. During the act of writing, the pen tip is pointed down at the writing surface. As the user transitions from using the pen to using a finger to perform a touch input (while still holding a pen) the pen tip is pointed away from the writing surface. An opposite pen angle orientation Occurs during the opposite transition, from touch input to pen input. Detecting and recognizing these two states of the angle of the pen allows the pen angle to trigger pen input to-touch input transitions and touch input to pen input transitions.

If the stylus is detected as present and is pointed at the surface, the system of the present invention rejects inputs initiated by a user's finger (or other) touch and allows pen inputs. Gestures such as pinch-and-zoom, left and right swipes, and some taps in non-inking areas may be supported; but when the pen is present, inking is only allowed through pen inputs. If the pen is detected as present, but is pointed away from the writing surface of the touch screen, the system of the present invention rejects inputs from the stylus and allows touch inputs. If pen is not detected as present, the system ignores all pen inputs.

The present invention further provides significant improvements in the erasing function. Significantly the user can invoke the erasing function with her fingers while still holding the pen. Several different erasing gestures are supported. The size of the eraser in the present invention is proportional to the pressure level, contact size or signal level of the pen or the user's finger performing the erasing.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

After evaluating many of the best industry devices incorporating a touch screen input device that support both touch and pen input simultaneously, it was discovered that the industry has not found a sufficient way to harmonize pen and touch input. The transition from pen to touch input and touch to pen input is not a reliable process for the user. To make writing with a pen or stylus on a device such as a tablet a pleasant experience, the pen-to-touch and touch-to-pen transition needs to be improved and harmonized.

Figure 1:
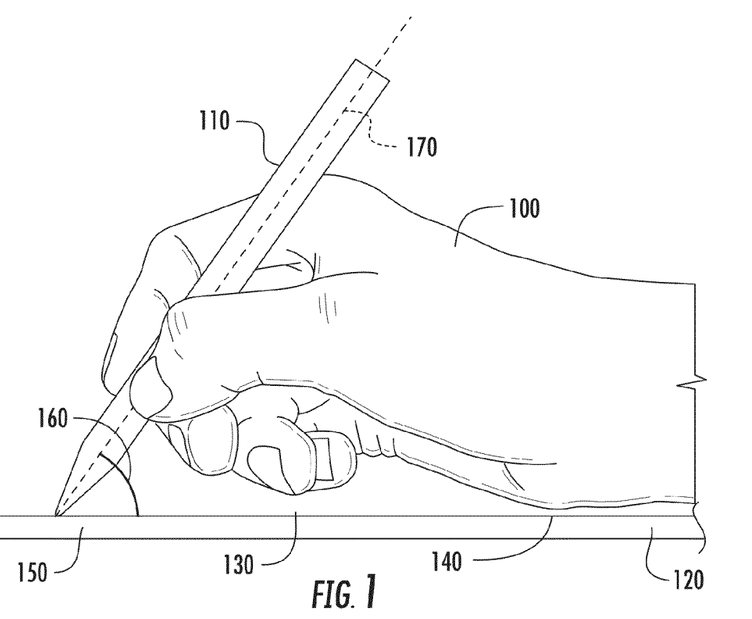
FIG. 1 illustrates a state of pen input where the pen is pointed down during the act of writing.

The main approach taken by traditional devices, palm rejection, is ineffective because during the act of writing, a user's hand makes varying amount and types of contact with the writing surface, mainly for support. FIG. 1, illustrates a exemplary orientation of a user's hand 100, a pen or stylus and a touch screen 120 of an electronic device, such as a tablet. As shown in FIG. 1, when using a pen 110, the user's finger 130 and palm 140 will typically both rest on the writing surface of the touch screen 120 during the process of writing/inputting with the pen tip 150. The varying amounts of contact by the user's finger 130 and palm 140 eventually produce touches that are detected by the touch screen 120 system that resemble finger inputs. These detected touches erroneously lead the system to interpret the unintended touches as intentional touches. These erroneous interpretations by tablet devices can be a frustrating experience for users. From this observation it was determined that another way to reject touch is needed rather than just broadly rejecting palm 140 and finger 130 inputs.

Figure 2:
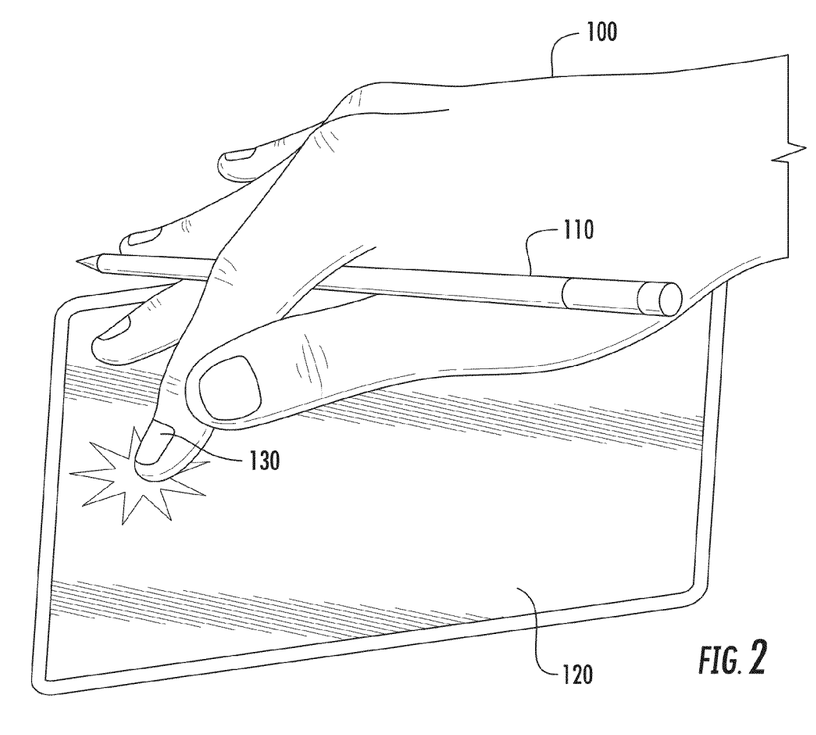
FIG. 2 depicts a state of touch input where the pen is pointed away while engaged in touch input.

As briefly described above and in more detail below, the present invention solves the problem of the prior art by detecting and recognizing the angle 160 of the pens/stylus during the two different operations—pen input and finger input. FIG. 1 illustrates an exemplary pen input orientation, while FIG. 2 depicts an exemplary finger input orientation. As shown in FIG. 1, during the act of pen input, the pen tip 150 is pointed down at the writing surface 120 forming an angle 160 between the axis of the pen 170 and the writing surface 120. As illustrated in FIG. 2, as the user transitions from using the pen 110 to using her finger 130 during a touch input while holding the pen 110, the pen tip 150 is pointed away from the writing surface 120. The angle between the pen 110 and the writing surface 120 during the touch input orientation of FIG.

2 is significantly close to zero degrees, than the angle 160 of the pen 110 during the pen input as illustrated in FIG. 1.

The present invention improves rejection of unintentional touch input by detecting the orientation and angle 160 of the pen 110. The system and method of the present invention results in smoother and more reliable pen-to-touch and touch-to-pen transitions and overall user experience. The system and method of the present invention reliably and accurately suppresses touch input when the pen tip 150 is detected as being in the vicinity of the writing surface 120 and as pointed down at the writing surface 120. The system and method of the present invention further reliably and accurately enables touch and gesture input when the pen tip 150 is pointed away from writing surface 120.

The system of the present invention operates on the basis that the act of writing with a pen/stylus 110 requires that the pen 110 be pointed at the general direction of the writing surface 120 as shown in FIG. 1, and that transition from a typical writing position to a finger touch input requires shifting the pen 110 such that it is pointed away from the writing surface 120 as shown in FIG. 2, or putting the pen 100 down altogether.

The present invention can utilizes conventional systems for detecting the angle of the stylus, such as described in U.S. Pat. No. 5,748,110. Preferably the pen detection system has the ability to detect the pen 110 at least 5 cm above the writing surface 120 and can further detect the angle 160 of the pen 110 with respect to the writing surface 120.

Figure 3:
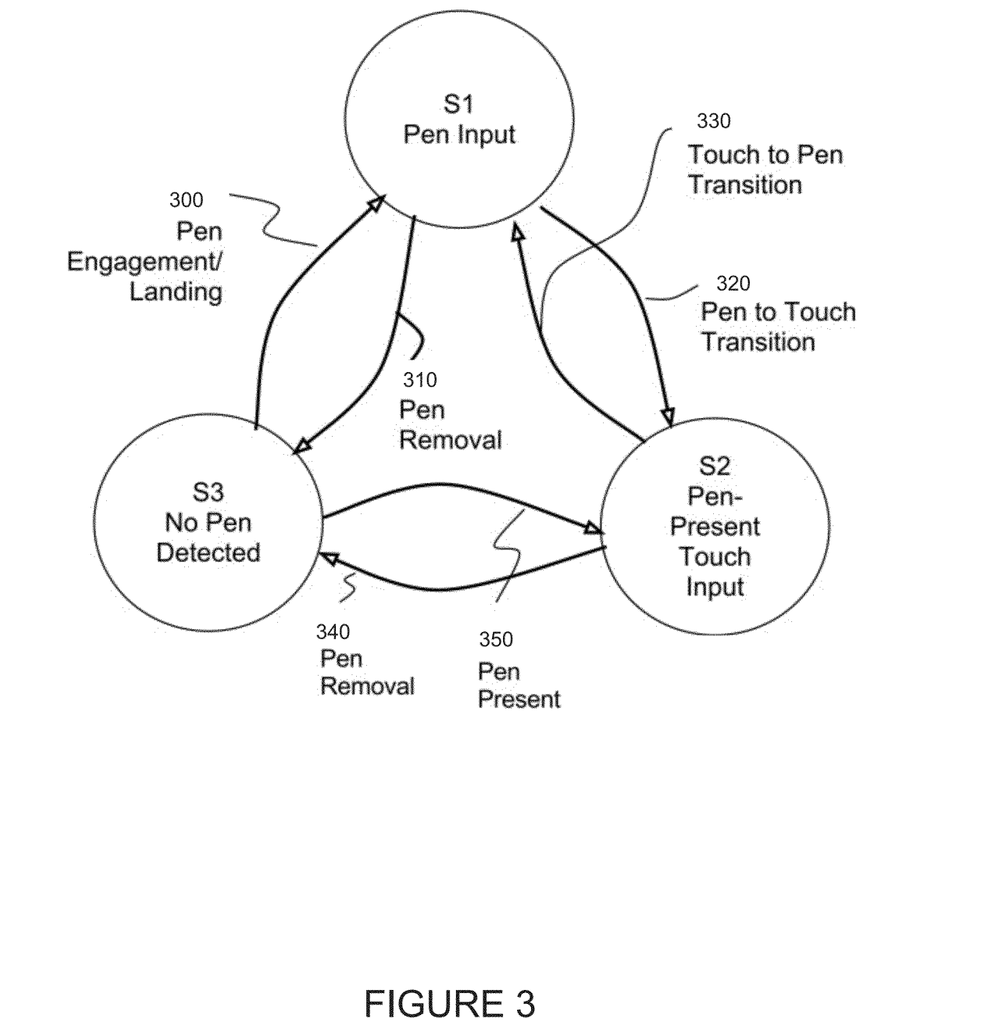
FIG. 3 is a Pen-Touch Transition State Machine.

FIG. 3 illustrates a state diagram of the pen-touch input system of the present invention. The system has three main states. In state S1, the PenInput State, the pen 110 is present and is pointing at the writing surface 120. In state S2, the PenPresentTouch State, the pen 110 is present above the touch surface 120, but is pointing away from the writing surface 120. In state S3, the NoPenDetected state, the pen detection system does not detect the pen 110. In this state, the system suppresses or ignores, pen inputs and only recognizes touch inputs.

As further shown in FIG. 3, associated with these three states, S1, S2 and S3, are the transitions therebetween. In transition 300, PenLanding, the system is transitioning from state S3 where no pen 110 is detected to state S1, the PenInput state, where the pen 110 is detected at a reasonable distance, 5 to 10 cm, above the writing surface 120 and is pointed down at the writing surface 120. Again, as described above, the detection system is able to detect the presence as well as the angle of the pen 110. During this pen landing scenario/event, touch input is suppressed or rejected in anticipation of the landing of user's hand/palm/fingers. This allows writing to be engaged without unintended touches around the palm, wrist and fingers. A pen detection mechanism such as one based on induction technology, is able to provide pen proximity and angle information when the pen is in close proximity. These two piece of information is sufficient to drive state machine illustrated and described in connection with FIG. 3. The exact pen angle threshold at which state transition are triggered is specific to the particular system under design. A general guide is given for a nominal system in the description below for FIG. 6.

In state S1, the PenInput State, pen writing/inking and tap selection by the pen 110 is supported as well erasing, as is further described below. In one embodiment, touch input is suppressed, but only in an area the screen where inking (pen input) is expected. In other areas on the screen, e.g., menus, perhaps control menus around the border of the screen, tap input by the user is allowed.

In the reverse transition, 310, the system transitions from the PenInput state S1, where input by the pen 110 is allowed and finger touches are suppressed, to the NoPenDetected state S3, where pen 110 input is suppressed and finger input is allowed.

Figure 6:
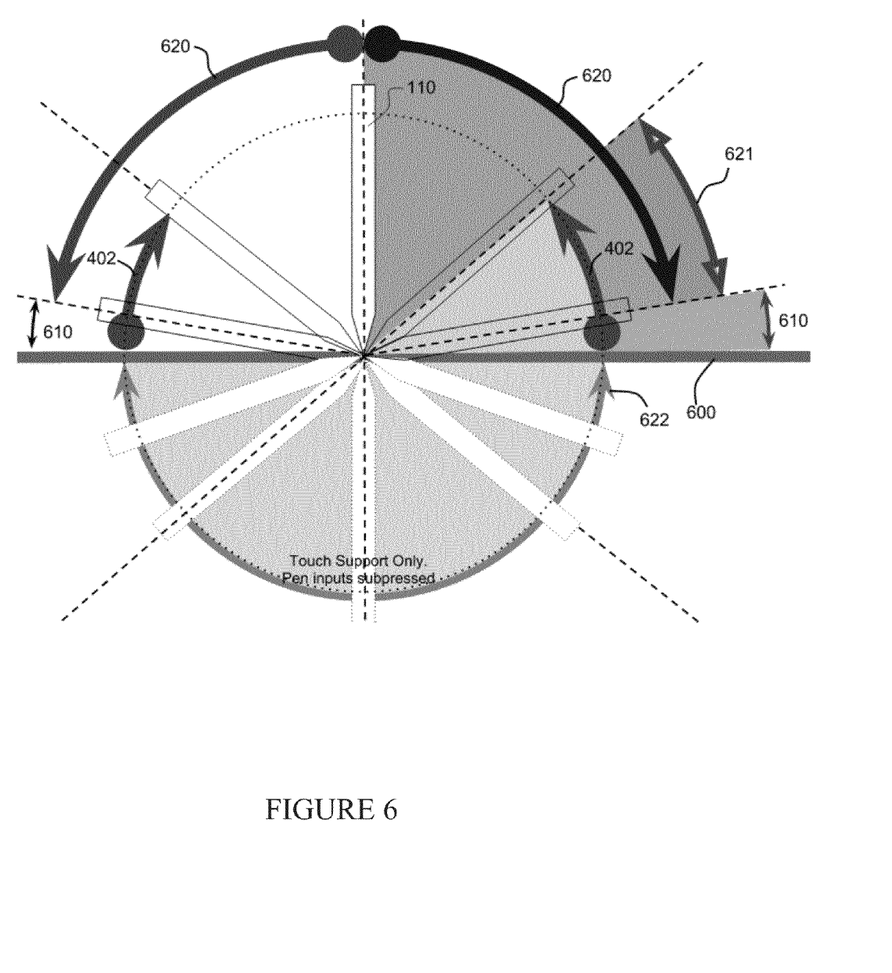
FIG. 6 illustrates the Pen Tip Angle.

In transition 320, from state S1, Pen/Input, to state 82, PenPresentTouch, the system detects that the pen angle goes from pointing at the writing surface 120 to pointing away from the writing surface 120. Once in the state 82, pen inputs are suppressed and touch inputs are allowed. Again, the exact pen angle threshold at which state transition are triggered is specific to a given system. A general guideline is given for a nominal system is shown in FIG. 6. State S2, PenPresentTouch, is defined as the state when the pen 110 is detected as present but pointing away from the writing surface 120. In state S2, touch inputs are accepted while pen inputs are suppressed. Similarly, in the reverse transition 330, the system detects that the pen angle goes pointing away from the writing surface 120 to pointing at the writing surface 120.

In the reverse transition 330 from PenPresentTouch state S2 to PenInput state S1, the angle of the pen 110 goes from roughly horizontal to being pointed down at the writing surface 120. At some point during this transition, the system begins to allow pen input and suppresses touch input. However, both in the transition 320 and the PenIput state S1, certain touch gestures may be supported, including touch gesture such as left and right swipe.

In transition 340, from state S2, PenPresenTouch, to state S3, NoPenDetected, the system detects that the pen angle goes from pointing away from the writing surface 120 to not being detected at all. In the reverse transition 350, the system goes from not detecting the pen 110 at all, to detecting the presence of the pen 110, but that the pen angle is pointed away from the writing surface 120. In the state S3, pen inputs are suppressed and touch inputs are allowed.

Figure 4:
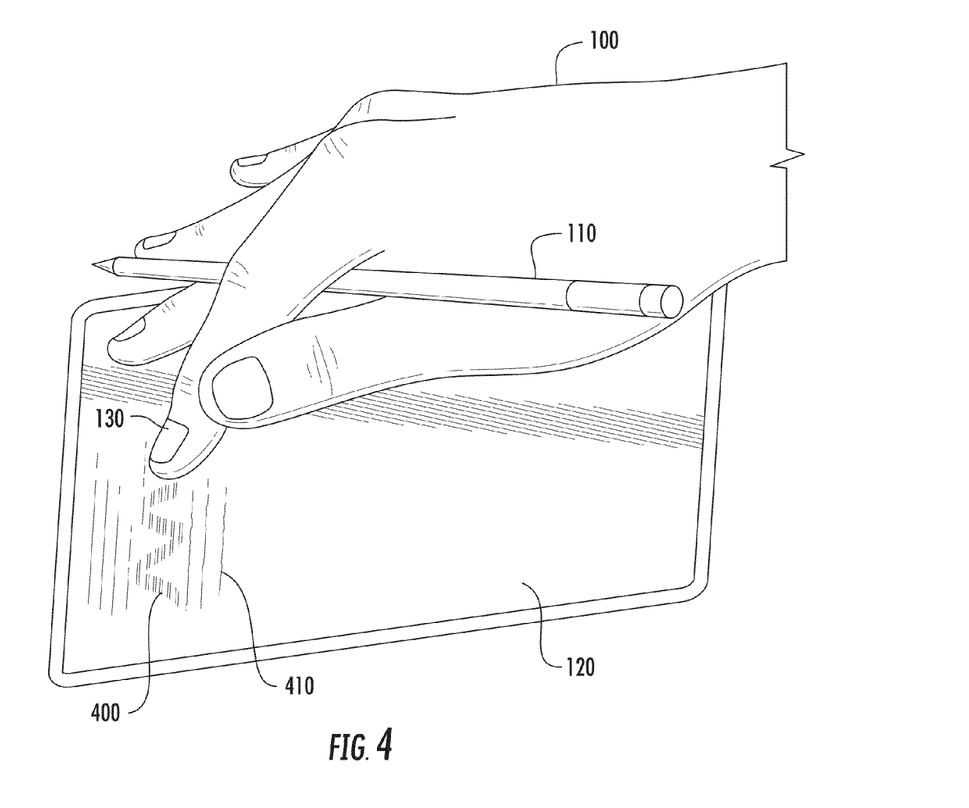
FIG. 4 illustrates an erase gesture while a user is holding a pen.

State S2 is a special state of the system that further enables a special set of Pen Present Gestures to be supported. One example of a Pen Present Gesture, illustrated in FIG. 4, is the pen-present erase gesture that allows a finger 130 to erase while holding a pen 110. This particular gesture is illustrated in FIG. 4. As further described below, the size or diameter of the 'eraser' is directly proportional to the amount of contact, pressure level and/or signal level of the touch exerted by the user. When the pen 110 is first detected as hovering above the display in such a way that the pen tip 150 is pointing away from the writing surface 120 as described above, the system enters the state S2 and enables Pen Present Gestures.

Figure 5:
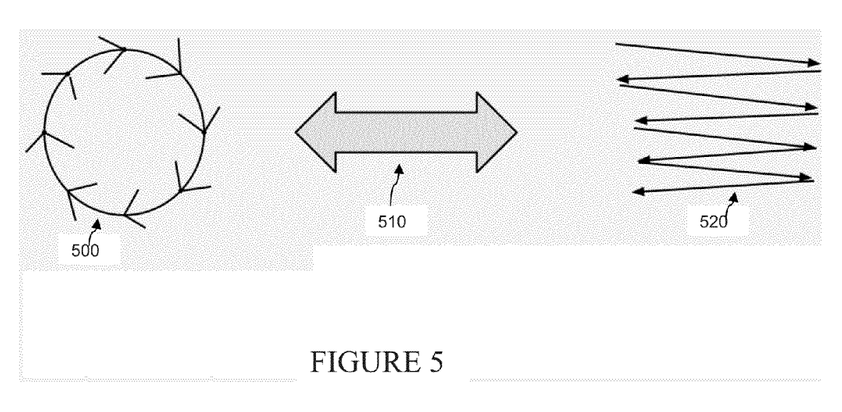
FIG. 5 depicts examples of erase gestures.

To initiate the erase gesture, the user's finger 130 touches down on the writing surface 120 and is then detected. In the erasing gesture illustrated in this FIG. 4, the user's finger 130 stays down on the touch screen surface 120 and goes through an erasing motion, which consists of for example, the vertical zigzag motion 400 as illustrated in FIG. 4. The erasing function serves to erase the writing or other image 410 shown on the display. Alternative erasing motions such as a circular motion 500, a hack-and-forth motion 510 or a horizontal zigzag motion 520 as illustrated in FIG. 5 can be executed.

As described above, the detection and transition between states in the system and method of the present invention is a combination of the proximity of the pen tip 150 to the writing surface 120 and the angle of the pen 110 with respect to the plane of the writing surface 120. FIG. 6 conceptually illustrates the angles at which transitions between states occur. Element 600 represents a plane parallel to the surface of the touch screen 120. The plane 600 does not have to be coincident with the surface 120, but can be some distance away from the surface, e.g., 5-10 cm, as described above. Pen Input Cut Off Angle 610 can also be called the Pen Input Disengagement Angle, and is used for state transition 310, going from S1 to S2. This cutoff angle is the pen angle at which pen input discontinues. Typically, this angle is set, predetermined, in the system and is approximately 25 degrees, but can be changed by the designer of the system, and can additionally be configurable by the user as a user setting. As seen in FIG. 6, the user transitioning from the pen input to the finger input would alter the angle of the pen some where in the range 620 of 90 degrees from the surface to the disengagement angle 610.

A different angle, 402, is used to re-engage the pen input when going from a horizontal position to a pen engaged position at angle 402 of approximately 45 degrees. The difference 621 between the Pen Disengagement angle 610 and Pen Reengagement angle 402 provides hysteresis between the S1 and S2 states. The input cut-off angle 610 is important in determining that the user is intending to stop using the pen 110 for input and it is therefore safe for the system to begin accepting a selective set of finger inputs. Specifically, if the system determines that the pen angle is less than the Pen Input Cut Off Angle 610, the system enters the PenPresentTouch state S2 (see FIG. 3). Table 1 illustrates the relationship between the state transition and the pen angle.

TABLE 1

| Transition ID | State Transition | Active Input Type | Trigger Angle |
|---|---|---|---|
| 310 | S1 to S2 | Switch from pen input to Pen-Present Gesture State S2 | 610 |
| 320 | S2 to S1 | Switching from Pen-Present Gesture State to Pen input/inking. | 402 |
| 340 | S2 to S3 | Pen is out of detection range | N/A |
| 350 | S3 to S2 | Pen come into detection range but it is pointing away from writing surface | 402 |
| 300 | S3 to S1 | Pen enters directly into pen input mode | 402 |
| 310 | S1 to S3 | Pen exits directly out of pen input mode by going out of detection range | N/A |

In state S2, as described above, the pen is detected as present but detected as pointing away from the touch surface 120. In this state S2, pen input is suppressed and touch input is enabled. If the system subsequently determines that the pen angle is greater than the Pen Input Reengagement Angle 420, the system enters the PenInput state S1 (see FIG. 3). In this state S1, as described above, the pen is detected as present and is detected as pointing at the touch surface 120. In this state S1, pen input is enabled and touch input is suppressed.

Pen Input Reengagement Angle 402 is the angle at which the pen input is enabled. Note that the Pen input Reengagement angle 402 is greater than the pen cut-off angle 401. The difference 621 between these two angles 610 and 420 s is to provide hysteresis and a debouncing mechanism for the two states and reduce the chance of oscillation between S1 and S2. In the transition from S1 to S2, angle 610 is used. Once the system is in S2, angle 402 is used to return to S1. This hysteresis provide debouncing that reduces the likelihood of oscillation and poor user experience.

In addition to receiving writing input from the pen 110 and receiving touch input from the user's fingers 130, the present invention also provides for erasing capabilities for both the pen 110 and the user's finger 130. Erasing can be enabled, for example, by a switch or button on the pen. Such a switch or button can change the mode of the pen from that of an writing utensil to an erasing utensil. Alternatively, the change in modes from writing input to erasing can be accomplished directly on the electronic device itself. Regardless of how the eraser mode is entered, once in the eraser mode, the system interprets touches from the pen or the finger to be erasing gestures.

Figure 7:
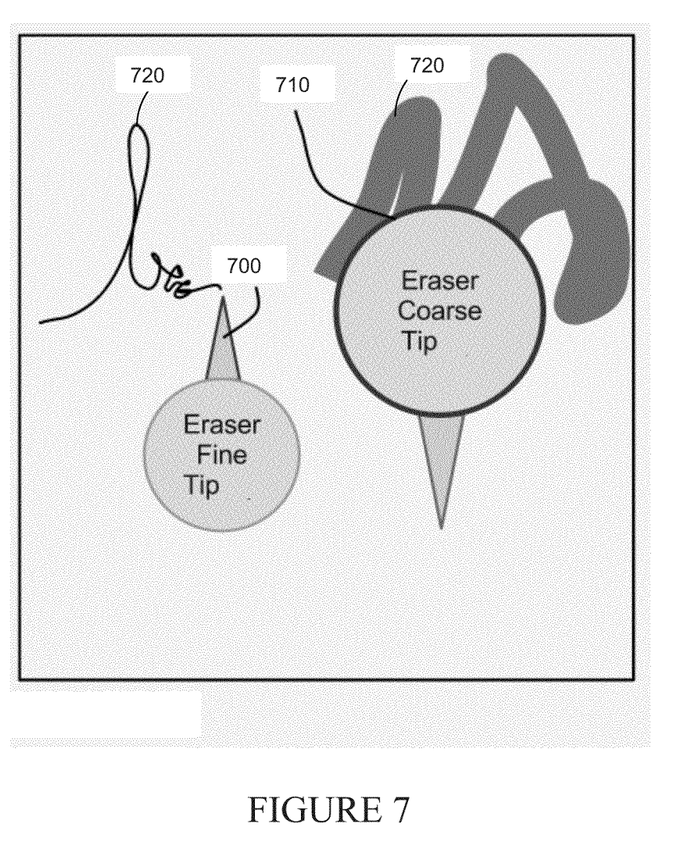
FIG. 7 depicts fine and course erase gestures.
Figure 8:
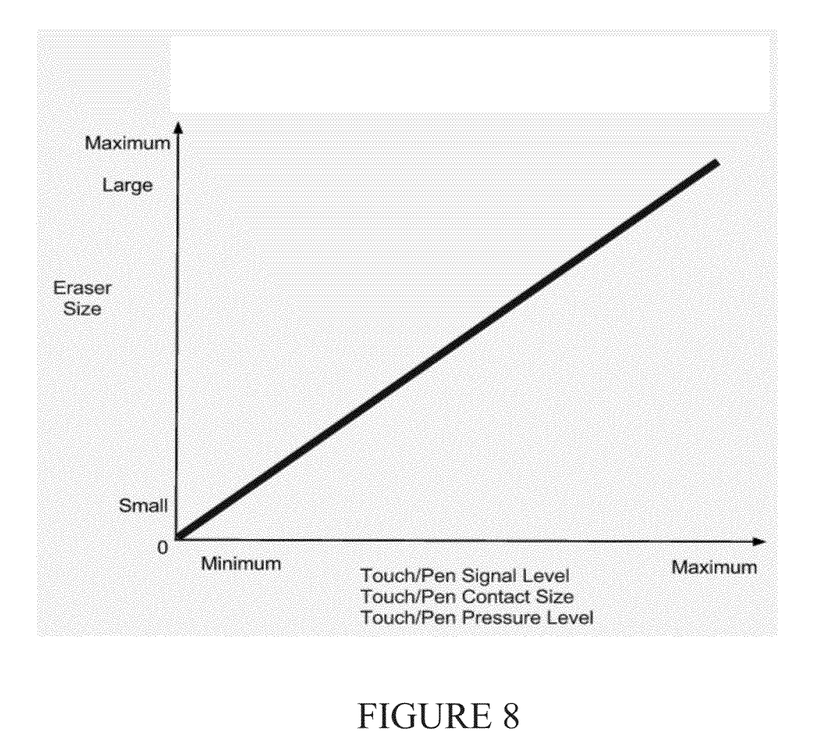
FIG. 8 illustrates the relationship between the eraser size and various inputs.

In a preferred embodiment, the size or diameter of the eraser function is proportional to the pressure level exerted by the user. Optionally, the eraser is displayed as feedback to the user. The eraser function can be accomplished either by the pen 110 or the user's finger 130. The eraser function of the present invention is depicted in FIG. 7. As seen in this FIG. 7, the user can be provided visual feedback on their erasing input by the illustration 720 on the display of the device of their erasing movements. The eraser function has two main orientations: Fine Tip 700 or Coarse tip 710. When the user exerts low touch or pen pressure levels the Fine tip eraser function 700 is activated or point up. When the touch/pen pressure has reached a certain level, the Coarse tip eraser function 710 is activated providing a larger tip and effectively a larger eraser. The relationship between the pressure level, contact size or signal level of the pen or the user's finger is illustrated in FIG. 8. The pressure level, contact size or signal level of the pen or the user's finger is plotted along the X axis, while the size of the resulting eraser is plotted on the Y axis. As seen in this FIG. 8, in the preferred embodiment, there is a direct, proportional relationship between the erase size and the pressure level, contact size or signal level of the pen or the user's finger. In this preferred embodiment, the switch between Fine and Course eraser is automatic after a certain predetermined pressure has been reached. The automatic switching of the erase tip, and the eraser's overall size dependency on touch signal/contact level or pen pressure level, provides a quick, easy and comprehensive way to control the eraser and editing small and large areas.

The automatic sizing and tip selection is configurable just as the system can be configured to disable and enable touch and/or pen input as well as the pen-angle-based touch suppression mechanism as described above.

Optionally, the eraser orientation can be user selectable including the following methods: (a) button or switch on pen; (b) increasing the pressure level by pressing harder on the writing surface.

Figure 9:
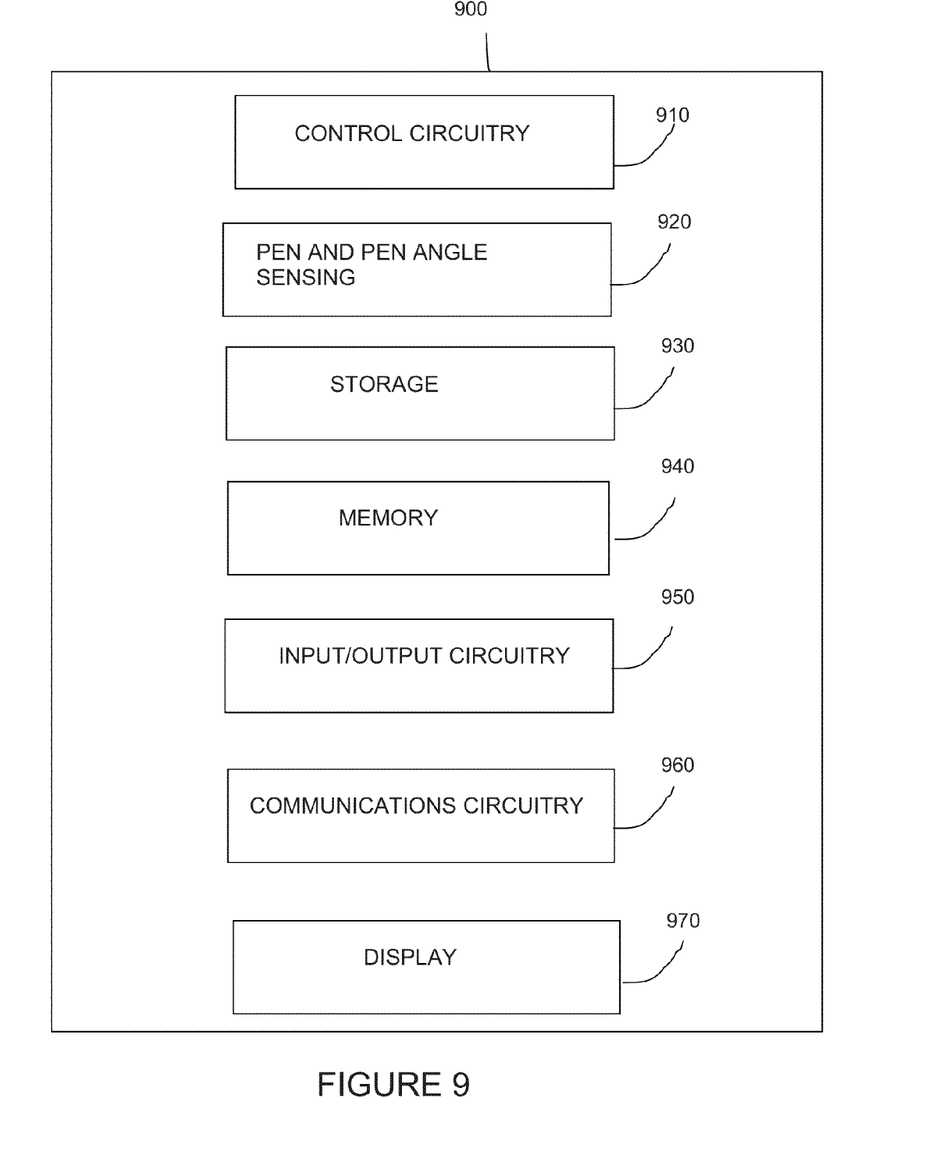
FIG. 9 illustrates the components of an exemplary device.

FIG. 9 illustrates an exemplary device 900 employing the present invention. As appreciated by those skilled the art, the device 900 can take many forms capable of operating the present invention. In a preferred embodiment, the device 900 is a mobile electronic device, and in an even more preferred embodiment device 900 is an electronic reader device, such as a tablet device. Electronic device 900 can include control circuitry 910, storage 930, memory 940, input/output ("I/O") circuitry 950, communications circuitry 960, and display 970. In some embodiments, one or more of the components of electronic device 900 can be combined or omitted, e.g., storage 930 and memory 940 may be combined. As appreciated by those skilled in the art, electronic device 900 can include other components not combined or included in those shown in this Figure, e.g., a power supply such as a battery, an input mechanism, etc.

Electronic device 900 can include any suitable type of electronic device. For example, electronic device 900 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 900 can include a larger portable electronic device, such as a laptop computer. As yet another example, electronic device 900 can include a substantially fixed electronic device, such as a desktop computer.

Control circuitry 910 can include any processing circuitry or processor operative to control the operations and performance of electronic device 900. For example, control circuitry 910 can be used to run operating system applications, firmware applications, media playback applications, media editing applications, or any other application. Control circuitry 910 can drive the display 970 and process inputs received from a user interface, e.g., the touch screen display 970.

Pen and Pen Angle sensing component 920 contains pen and pen angle information detecting circuitry. The pen detection circuitry detects the presence of the pen and also the distance of the pen from the writing surface of the touch screen display. The angle information detecting circuitry detects the angle of a stylus relative to the plane of writing surface of touch screen display. Conventional circuitry can be used in sensing component 920 such as inductive sensor as described in U.S. Pat. No. 5,748,110. The pen sensing component 920 includes software operable to communicate the sensed pen presence, distance and pen angle to the control circuitry 910.

Storage 930 can include, for example, one or more computer readable storage mediums including a hard-drive, solid state drive, flash memory, permanent memory such as ROM, magnetic, optical, semiconductor, paper, or any other suitable type of storage component, or any combination thereof. Storage 930 can store, for example, media content, e.g., eBooks, music and video files, application data, e.g., software for implementing functions on electronic device 900, firmware, user preference information data, e.g., content preferences, authentication information, e.g., libraries of data associated with authorized users, transaction information data, e.g., information such as credit card information, wireless connection information data, e.g., information that can enable electronic device 900 to establish a wireless connection, subscription information data, e.g., information that keeps track of podcasts or television shows or other media a user subscribes to, contact information data, e.g., telephone numbers and email addresses, calendar information data, and any other suitable data or any combination thereof. The instructions for implementing the functions of the present invention may, as non-limiting examples, comprise software and/or scripts stored in the computer-readable media 930

Memory 940 can include cache memory, semi-permanent memory such as RAM, and/or one or more different types of memory used for temporarily storing data. In some embodiments, memory 940 can also be used for storing data used to operate electronic device applications, or any other type of data that can be stored in storage 930. In some embodiments, memory 940 and storage 930 can be combined as a single storage medium.

I/O circuitry 950 can be operative to convert, and encode/decode, if necessary analog signals and other signals into digital data. In some embodiments, I/O circuitry 950 can also convert digital data into any other type of signal, and vice-versa. For example, I/O circuitry 950 can receive and convert physical contact inputs, e.g., from a multi-touch screen, i.e., display 970, pen sensing signals from Pen and Pen Angle sensing component 920, physical movements, e.g., from a mouse or sensor, analog audio signals, e.g., from a microphone, or any other input. The digital data can be provided to and received from control circuitry 910, storage 930, and memory 940, or any other component of electronic device 900. Although I/O circuitry 950 is illustrated in this Figure as a single component of electronic device 900, several instances of I/O circuitry 950 can be included in electronic device 900.

Electronic device 900 can include any suitable interface or component for allowing a user to provide inputs to I/O circuitry 950. For example, electronic device 900 can include any suitable input mechanism, such as a button, keypad, dial, a click wheel, or a touch screen, e.g., display 970. In some embodiments, electronic device 900 can include a capacitive sensing mechanism or a multi-touch capacitive sensing mechanism. As described above, device 900 includes Pen and Pen Angle sensing component 920 for detecting an interpreting the angle and presence of a pen/stylus.

In some embodiments, electronic device 900 can include specialized output circuitry associated with output devices such as, for example, one or more audio outputs. The audio output can include one or more speakers, e.g., mono or stereo speakers, built into electronic device 900, or an audio component that is remotely coupled to electronic device 900, e.g., a headset, headphones or earbuds that can be coupled to device 900 with a wire or wirelessly.

Display 970 includes the display and display circuitry for providing a display visible to the user. For example, the display circuitry can include a screen, e.g., an LCD screen, that is incorporated in electronics device 900. In some embodiments, the display circuitry can include a coder/decoder (Codec) to convert digital media data into analog signals. For example, the display circuitry or other appropriate circuitry within electronic device 1 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 900, information regarding ongoing communications operations, information regarding incoming communications requests, or device operation screens, under the direction of control circuitry 910. Alternatively, the display circuitry can be operative to provide instructions to a remote display.

Communications circuitry 960 can include any suitable communications circuitry operative to connect to a communications network and to transmit communications, e.g., data from electronic device 900 to other devices within the communications network. Communications circuitry 960 can be operative to interface with the communications network using any suitable communications protocol such as, for example, Wi-Fi, a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 900 can include one more instances of communications circuitry 960 for simultaneously performing several communications operations using different communications networks, although only one is shown in FIG. 9 to avoid overcomplicating the drawing. For example, electronic device 900 can include a first instance of communications circuitry 960 for communicating over a cellular network, and a second instance of communications circuitry 960 for communicating over Wi-Fi or using Bluetooth, in some embodiments, the same instance of communications circuitry 960 can be operative to provide for communications over several communications networks.

In some embodiments, electronic device 900 can be coupled to a host device for data transfers, synching the communications device, software or firmware updates, providing performance information to a remote source, e.g., providing reading characteristics to a remote server, or performing any other suitable operation that can require electronic device 900 to be coupled to a host device. Several electronic devices 900 can be coupled to a single host device using the host device as a server. Alternatively or additionally, electronic device 900 can be coupled to several host devices, e.g., for each of the plurality of the host devices to serve as a backup for data stored in electronic device 900.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A method for controlling an electronic device, the electronic device having an input surface and sensors for detecting touch input and pen input, the method comprising:
   detecting a proximity of a pen device to the input surface;
   detecting an angle of the pen device with respect to the input surface;
   determining if the proximity of the pen device to the input surface is greater or less than a first predetermined value;
   determining if the angle of the pen device with respect to the input surface is greater or less than a second predetermined value;
   accepting input from the pen device and suppressing touch input if the proximity of the pen device to the input surface is less than a first predetermined value and the angle of the pen device with respect to the input surface is greater than a second predetermined value;
   detecting a first change in the angle of the pen device with respect to the input surface;
   suppressing input from the pen device and accepting touch input if the proximity of the pen device to the input surface is less than the first predetermined value and the angle of the pen device with respect to the input surface is less than the second predetermined value;
   detecting a second change in the angle of the pen device with respect to the input surface; and
   accepting input from the pen device and suppressing touch input if the proximity of the pen device to the input surface is less than the first predetermined value and the angle of the pen device with respect to the input surface is greater than a third predetermined value, wherein the third predetermined value is greater than the second predetermined value and the difference between the second and third predetermined values provides hysteresis between states of accepting and suppressing pen and touch input.

2. The method according to claim 1, further comprising:
   detecting a third change in the proximity of the pen device to the input surface; and
   suppressing input from the pen device and accepting touch input if the proximity of the pen device to the input surface is greater than the first predetermined value.

3. The method according to claim 1, wherein the first predetermined value is between 5 centimeters and 10 centimeters.

4. A non-transitory computer-readable media comprising a plurality of instructions that, when executed by at least one electronic device, cause the at least one electronic device to:
   detect a proximity of a pen device to an input surface of the at least one electronic device;
   detect an angle of the pen device with respect to the input surface;
   determine if the proximity of the pen device to the input surface is greater or less than a first predetermined value;
   determine if the angle of the pen device with respect to the input surface is greater or less than a second predetermined value;
   accept input from the pen device and suppress touch input if the proximity of the pen device to the input surface is less than a first predetermined value and the angle of the pen device with respect to the input surface is greater than a second predetermined value;
   detect a first change in the angle of the pen device with respect to the input surface;
   suppress input from the pen device and accepting touch input if the proximity of the pen device to the input surface is less than the first predetermined value and the angle of the pen device with respect to the input surface is less than the second predetermined value;
   detect a second change in the angle of the pen device with respect to the input surface; and
   accept input from the pen device and suppressing touch input if the proximity of the pen device to the input surface is less than the first predetermined value and the angle of the pen device with respect to the input surface is greater than a third predetermined value, wherein the third predetermined value is greater than the second predetermined value and the difference between the second and third predetermined values provides hysteresis between states of accepting and suppressing pen and touch input.

5. The non-transitory computer-readable media according to claim 4, wherein the instructions further cause the at least one electronic device to
   detect a third change in the proximity of the pen device to the input surface; and
   suppress input from the pen device and accepting touch input if the proximity of the pen device to the input surface is greater than the first predetermined value.

6. A system for controlling an electronic device comprising:
   a memory that includes instructions for operating the electronic device;
   a display screen;
   an input surface;
   sensors for detecting touches on the input surface;
   sensors for detecting the proximity and angle of a pen device with respect to the input surface; and
   control circuitry coupled to the memory, coupled to the input surface, coupled to the sensors and coupled to the display screen, the control circuitry executing the instructions and is operable to:
   detect a proximity of a pen device to the input surface of the electronic device;
   detect an angle of the pen device with respect to the input surface;
   determine if the proximity of the pen device to the input surface is greater or less than a first predetermined value;
   determine if the angle of the pen device with respect to the input surface is greater or less than a second predetermined value; and
   accept input from the pen device and suppress touch input if the proximity of the pen device to the input surface is less than a first predetermined value and the angle of the pen device with respect to the input surface is greater than a second predetermined value;
   detect a first change in the angle of the pen device with respect to the input surface;
   suppress input from the pen device and accepting touch input if the proximity of the pen device to the input surface is less than the first predetermined value and the angle of the pen device with respect to the input surface is less than the second predetermined value;

detect a second change in the angle of the pen device with respect to the input surface; and accept input from the pen device and suppressing touch input if the proximity of the pen device to the input surface is less than the first predetermined value and the angle of the pen device with respect to the input surface is greater than a third predetermined value, wherein the third predetermined value is greater than the second predetermined value and the difference between the second and third predetermined values provides hysteresis between states of accepting and suppressing pen and touch input.

7. The system according to claim 6, wherein the control circuitry executing the instructions and is further operable to:

detect a third change in the proximity of the pen device to the input surface; and suppress input from the pen device and accepting touch input if the proximity of the pen device to the input surface is greater than the first predetermined value.

8. The non-transitory computer-readable media according to claim 4, wherein the first predetermined value is between 5 centimeters and 10 centimeters.

9. The system according to claim 6, wherein the first predetermined value is between 5 centimeters and 10 centimeters.

* * * * *